United States Patent
Sons et al.

(10) Patent No.: US 9,524,529 B2
(45) Date of Patent: Dec. 20, 2016

(54) INTERVAL ANALYSIS TOOL FOR ENERGY CONSUMPTION

(71) Applicant: Cenergistic Inc., Dallas, TX (US)

(72) Inventors: Bryan Sons, Dallas, TX (US); Jack Bullock, Dallas, TX (US)

(73) Assignee: CENERGISTIC LLC, Dallas, TX (US)

( * ) Notice: Subject to any disclaimer, the term of this patent is extended or adjusted under 35 U.S.C. 154(b) by 928 days.

(21) Appl. No.: 13/670,602

(22) Filed: Nov. 7, 2012

(65) Prior Publication Data

US 2014/0129161 A1    May 8, 2014

(51) Int. Cl.
*G06Q 50/06*    (2012.01)
*G06Q 10/06*    (2012.01)

(52) U.S. Cl.
CPC .............. *G06Q 50/06* (2013.01); *G06Q 10/06* (2013.01)

(58) Field of Classification Search
CPC ..... G01R 21/006; G01R 21/133; G01R 22/00; G06Q 10/06; G06Q 50/06; F24F 11/0034; F24F 2011/0035
USPC ........................ 702/61, 60; 705/36 R; 706/46
See application file for complete search history.

(56) References Cited

U.S. PATENT DOCUMENTS

| | | | |
|---|---|---|---|
| 6,216,956 B1 * | 4/2001 | Ehlers | F24F 11/006 236/47 |
| 7,216,021 B2 | 5/2007 | Matsubara et al. | |
| 7,966,104 B2 | 6/2011 | Srivastava et al. | |
| 8,086,352 B1 | 12/2011 | Elliott | |
| 8,140,193 B2 | 3/2012 | Lee | |

(Continued)

FOREIGN PATENT DOCUMENTS

| | | |
|---|---|---|
| EP | 2012669 b1 | 1/2012 |
| EP | 2408082 A1 | 1/2012 |

(Continued)

OTHER PUBLICATIONS

Hirsch et al., Building Energy Use and Cost Analysis Program; vol. 1: Basic; Oct. 2004; http://doe2.com/download/DOE-22/DOE22Vol1-Basics.pdf.*

(Continued)

*Primary Examiner* — Mohamed Charioui
*Assistant Examiner* — Catherine Rastovski
(74) *Attorney, Agent, or Firm* — Schultz & Associates, P.C.

(57) ABSTRACT

A system and method for analyzing energy savings for a building is provided. The method includes receiving a schedule of occupied days, an occupancy behavior profile and historical energy usage data from which an hourly interval usage is determined. A set of occupancy thresholds is determined by season. Occupied days are determined from the set of occupancy thresholds and the hourly interval usage. The hourly interval usage is analyzed to determine occupied energy consumption in hourly intervals, occupied start and stop time savings, mechanical equipment savings and temperature setpoint savings during an occupied day. The hourly interval usage is also analyzed to determine unoccupied energy consumption in the hourly intervals and refrigeration savings, mechanical equipment savings, computer equipment savings, parking lot lighting savings, hallway lighting savings and temperature setpoint savings during an unoccupied day. Energy consumption, energy savings, operational comparisons and monetary savings are reported.

31 Claims, 18 Drawing Sheets

(56) References Cited

U.S. PATENT DOCUMENTS

| | | |
|---|---|---|
| 8,155,900 B1 | 4/2012 | Adams |
| 8,239,178 B2 | 8/2012 | Gray et al. |
| 2002/0134849 A1 | 9/2002 | Disser |
| 2004/0102937 A1 | 5/2004 | Ibrahim |
| 2004/0254686 A1 | 12/2004 | Matsui et al. |
| 2005/0043862 A1 | 2/2005 | Brickfield et al. |
| 2007/0045431 A1 | 3/2007 | Chapman, Jr. et al. |
| 2009/0057424 A1* | 3/2009 | Sullivan ............ F24F 11/0009 236/51 |
| 2009/0187445 A1* | 7/2009 | Barclay et al. ............... 705/7 |
| 2010/0286937 A1* | 11/2010 | Hedley ............. G06Q 30/02 702/60 |
| 2010/0324962 A1 | 12/2010 | Nesler et al. |
| 2011/0046805 A1* | 2/2011 | Bedros et al. ............ 700/291 |
| 2011/0153090 A1 | 6/2011 | Besore et al. |
| 2011/0166913 A1 | 7/2011 | Buchanan |
| 2011/0231320 A1 | 9/2011 | Irving |
| 2011/0264291 A1 | 10/2011 | Le Roux et al. |
| 2011/0313578 A1 | 12/2011 | Jones et al. |
| 2012/0035776 A1 | 2/2012 | Zaragoza et al. |
| 2012/0065783 A1 | 3/2012 | Fadell et al. |
| 2012/0130924 A1 | 5/2012 | James |
| 2012/0166616 A1 | 6/2012 | Meehan et al. |
| 2012/0173456 A1 | 7/2012 | Hirl |

FOREIGN PATENT DOCUMENTS

| | | |
|---|---|---|
| WO | 86/00976 | 2/1986 |
| WO | 2012045027 A1 | 4/2012 |
| WO | 2012068591 A2 | 5/2012 |
| WO | 2012092622 A2 | 7/2012 |

OTHER PUBLICATIONS

Field et al., Energy performance of occupied non-domestic buildings: Assessment by analysing end-use energy consumption; Jan. 24, 1995; http://bse.sagepub.com/content/18/1/39.full.pdf.*

* cited by examiner

| | A | B | C | D | E | F | G |
|---|---|---|---|---|---|---|---|
| | ESIID | USAGE_DATE | USAGE_START_TIME | USAGE_END_TIME | USAGE_KWH | ESTIMATED_ACTUAL | CHANNEL_NUM |
| 10 | | | | | | | |
| 11 | 1044372000784200 | 2/18/2012 | 00:00 | 00:15 | 24.96 | A | 4 |
| 12 | 1044372000784200 | 2/18/2012 | 00:15 | 00:30 | 21.12 | A | 4 |
| 13 | 1044372000784200 | 2/18/2012 | 00:30 | 00:45 | 17.52 | A | 4 |
| 14 | 1044372000784200 | 2/18/2012 | 00:45 | 01:00 | 16.92 | A | 4 |
| 15 | 1044372000784200 | 2/18/2012 | 01:00 | 01:15 | 16.92 | A | 4 |
| 16 | 1044372000784200 | 2/18/2012 | 01:15 | 01:30 | 17.16 | A | 4 |
| 17 | 1044372000784200 | 2/18/2012 | 01:30 | 01:45 | 17.88 | A | 4 |
| 18 | 1044372000784200 | 2/18/2012 | 01:45 | 02:00 | 17.52 | A | 4 |
| 19 | 1044372000784200 | 2/18/2012 | 02:00 | 02:15 | 17.76 | A | 4 |
| 20 | 1044372000784200 | 2/18/2012 | 02:15 | 02:30 | 17.16 | A | 4 |
| 21 | 1044372000784200 | 2/18/2012 | 02:30 | 02:45 | 17.28 | A | 4 |
| 22 | 1044372000784200 | 2/18/2012 | 02:45 | 03:00 | 17.88 | A | 4 |
| 23 | 1044372000784200 | 2/18/2012 | 03:00 | 03:15 | 16.92 | A | 4 |
| 24 | 1044372000784200 | 2/18/2012 | 03:15 | 03:30 | 17.04 | A | 4 |
| 25 | 1044372000784200 | 2/18/2012 | 03:30 | 03:45 | 16.68 | A | 4 |
| 26 | 1044372000784200 | 2/18/2012 | 03:45 | 04:00 | 17.64 | A | 4 |
| 27 | 1044372000784200 | 2/18/2012 | 04:00 | 04:15 | 17.04 | A | 4 |

FROM FIG. 4A

| | | | | | | |
|---|---|---|---|---|---|---|
| 28 | 10443720007844200 | 2/18/2012 | 04:15 | 04:30 | 17.4 | A | 4 |
| 29 | 10443720007844200 | 2/18/2012 | 04:30 | 04:45 | 17.04 | A | 4 |
| 30 | 10443720007844200 | 2/18/2012 | 04:45 | 05:00 | 16.68 | A | 4 |
| 31 | 10443720007844200 | 2/18/2012 | 05:00 | 05:15 | 17.16 | A | 4 |
| 32 | 10443720007844200 | 2/18/2012 | 05:15 | 05:30 | 17.04 | A | 4 |
| 33 | 10443720007844200 | 2/18/2012 | 05:30 | 05:45 | 17.64 | A | 4 |
| 34 | 10443720007844200 | 2/18/2012 | 05:45 | 06:00 | 18.6 | A | 4 |
| 35 | 10443720007844200 | 2/18/2012 | 06:00 | 06:15 | 18.6 | A | 4 |
| 36 | 10443720007844200 | 2/18/2012 | 06:15 | 06:30 | 18.24 | A | 4 |
| 37 | 10443720007844200 | 2/18/2012 | 06:30 | 06:45 | 18.12 | A | 4 |
| 38 | 10443720007844200 | 2/18/2012 | 06:45 | 07:00 | 17.76 | A | 4 |
| 39 | 10443720007844200 | 2/18/2012 | 07:00 | 07:15 | 16.56 | A | 4 |
| 40 | 10443720007844200 | 2/18/2012 | 07:15 | 07:30 | 10.2 | A | 4 |
| 41 | 10443720007844200 | 2/18/2012 | 07:30 | 07:45 | 10.56 | A | 4 |
| 42 | 10443720007844200 | 2/18/2012 | 07:45 | 08:00 | 10.08 | A | 4 |
| 43 | 10443720007844200 | 2/18/2012 | 08:00 | 08:15 | 9.84 | A | 4 |
| 44 | 10443720007844200 | 2/18/2012 | 08:15 | 08:30 | 9.96 | A | 4 |
| 45 | 10443720007844200 | 2/18/2012 | 08:30 | 08:45 | 10.44 | A | 4 |
| 46 | 10443720007844200 | 2/18/2012 | 08:45 | 09:00 | 10.82 | A | 4 |

FIG. 5

| Building Consumption Information ~ 1290 | | |
|---|---|---|
| Annual Electrical Consumption (KWh): | 397,626 | |
| Predicted Savings Opportunity (KWh): | 135,287 | |
| Predicted Adjusted Consumption (KWh): | 262,339 | |
| | | |
| Savings Summary ~ 1295 | | |
| Occupancy Control Savings (73 Potential days): | 98,094 | 24.7% |
| Daily Schedule Control Savings (1 Potential Hours): | 7,732 | 1.9% |
| Accessory Equipment Operation Savings: | 16,878 | 4.2% |
| Set Point Management Savings: | 12,583 | 3.2% |

34% Savings $21646 Electrical Savings

FIG. 12B

OPERATIONAL SUMMARY

Project Summary

| Building Name | Filmore ES |
|---|---|

| Months Simulated: | JanFebMarAprMayJunJulAugSepOctNovDec |
|---|---|
| | 12/31/2011 |

Calculated Summary

| | |
|---|---|
| Building Total Consumption (KWh) | 397,626 |
| Unoccupied Consumption (KWh) | 143,797 |
| Occupied Consumption (KWh) | 253,829 |
| Calculated Savings (KWh) | 130,299 |
| Calculated Savings Percentage (%) | 33% |

Scheduled Occupancy Analysis

| | |
|---|---|
| Client Stated Occupied Days (Days) | 185 |
| Historical Data Calculated Occupied Days (Days) | 258 |
| Potential Occupied Days Reduction (Days) | 73 |
| Potential Occupancy KWh Reduction (KWh) | 98,094 |
| Potential Occupancy KWh Reduction (%) | 25% |

Monthly Occupancy Analysis

| | Jan | Feb | Mar | Apr | May | Jun | Jul | Aug | Sep | Oct | Nov | Dec |
|---|---|---|---|---|---|---|---|---|---|---|---|---|
| Calculated Monthly Occupancy | 21 | 20 | 23 | 21 | 22 | 17 | 19 | 23 | 20 | 21 | 23 | 21 |
| Scheduled Months Occupancy (Published Schedule) | 20 | 18 | 22 | 15 | 20 | 5 | 0 | 10 | 21 | 18 | 20 | 16 |
| Scheduled Occupancy Savings Opportunity (Days) | 1 | 2 | 1 | 6 | 2 | 12 | 19 | 13 | 0 | 3 | 3 | 5 |

Copy Operations Results to Summary

Copy Occupancy Information

FROM FIG. 13A

| Daily Operation Analysis | |
|---|---|
| Calculated Average Building Startup Period (Hours) | - 1335 |
| Calculated Average Building Shutdown Period (Hours) | 1.00 |
| Potential Building Operation Savings (KWh) | 7,732 |
| Potential Building Operation Savings Percentage (%) | 2% |
| Equipment Operation Analysis | |
| Daily Computer Equipment Shutdown | FALSE |
| Daily Occupancy Hallway Lighting Control | TRUE 1340 |
| Parking Lot Lighting Shutdown Control | FALSE |
| Unoccupied Exhaust Fan Control | FALSE |
| Summer Refrigeration Shutdown | FALSE |
| Calculated Potential Equipment Operation Savings (KWh) | 16,878 |
| Calculated Potential Equipment Operation Savings (%) | 4% |
| Temperature Control Savings Analysis | |
| Typical Occupied Cooling Set Point | 72 |
| Typical Occupied Heating Set Point | 70 |
| Typical Unoccupied Cooling Set Point | 80 |
| Typical Unoccupied Heating Set Point | 60 1345 |
| Calculated Set Point Control Savings (KWh) | 7,595 |
| Calculated Set Point Control Savings Percentage (%) | 2% |

SAVINGS SUMMARY OPERATIONAL ANALYSIS ROLLUP

| | A | B | C | D | E | F | G | H | I | J |
|---|---|---|---|---|---|---|---|---|---|---|
| 1 | | | | | | | | | | |
| 2 | | Clear Site Summary Sheet | | | | | | | | |
| 3 | | | | | | | | | | |
| 4 | | | | | | | | | | |
| 7 | Client Name | | | | | | | | | |
| 8 | | | | | | | | | | |
| 9 | Program Model Savings | | 24% | | | | | | | |
| 10 | | | | | | | | | | |
| 11 | | Scheduled Occupancy | | | | Daily Operation | | | | |
| 12 | Site Name | Occupancy Savings Opportunity (Days) | Occupancy Savings Potential (KWh) | Occupancy Savings Potential (%) | | Average Startup Period (Hours) | Startup Period Savings (Hours) | Daily Operation Savings Potential (KWh) | Daily Operation Saving Potential (%) | |
| 13 | Carmiatti Elementary | 12 | 15,785 | 23% | | 0 | 1 | 2,261 | 3% | |
| 14 | Filmore ES | 73 | 98,094 | 25% | | 0 | 1 | 7,732 | 2% | |
| 15 | Victory ES | 28 | 25,059 | 8% | | 0 | 2 | 8,856 | 3% | |
| 16 | King ES | 36 | 68,049 | 13% | | 0 | 2 | 18,405 | 3% | |
| 17 | McKinley ES | 33 | 44,605 | 10% | | 0 | 2 | 13,897 | 3% | |
| 18 | Transportation | 31 | 37,135 | 11% | | 0 | 0 | 1,923 | 1% | |
| 19 | | | | | | | | | | |
| 20 | | | | | | | | | | |

1400, 1405, 1410, 1415, 1420, 1425, 1430, 1435, 1440

INTERVAL ANALYSIS TOOL FOR ENERGY CONSUMPTION

FIELD OF THE INVENTION

The present invention relates to assessment and control of operational factors in a building to impact energy consumption by the building and occupants.

BACKGROUND OF THE INVENTION

Control of operational energy costs continues to be a high priority with businesses and governments. Often the operational energy costs are impacted significantly by occupant behavior in addition to the mechanical systems and building envelope. The assessment and implementation of operational energy savings related to mechanical systems consumption due to heating and cooling loads is fairly well understood. Implementation of energy savings due to building envelope upgrades, for example, an upgrade of glazing systems or addition of insulation provides measurable results. However, implementation of energy savings due to changes in occupant behavior is not well understood. Occupant behavior varies widely depending on many factors. Therefore, observation and feedback of occupant behavior impact on energy usage is necessary to isolate occupant related savings from mechanical system and building envelope related savings.

U.S. Patent Application No. 2012/0173456 to Hirl discloses assessing the performance of a building to support operational and financial decisions with multiple data processes to improve building energy usage. However, Hirl does not look at detailed operations of accessory equipment and lighting to determine energy savings.

U.S. Pat. No. 8,239,178 to Gray, et al. discloses computer monitoring of energy loads to provide predicted data values to a load monitoring server. Gray while modeling the energy loading of a building does not describe a detailed model of how to affect the energy load and realize energy savings.

U.S. Pat. No. 7,216,021 to Matsubara, et al. discloses a system for managing energy consumption for a facility that calculates wasteful energy consumption of a unit belonging to the facility based on an operational past record. Matsubara requires an onsite building management system utilizing a comfort index control and collection of operational past records for the individual units of the facility which is costly and complex.

U.S. Patent Application No. 2010/0324962 to Nesler, et al. discloses a computer program that processes information from an energy grid to calculate values used for the control of mechanical systems. Nesler requires an integrated control layer and active building management which can be costly and overly complex, especially for simpler building environments.

U.S. Patent Application No. 2012/0130924 to James discloses analyzing energy use in a building based on factors such as weather and configurable energy settings for devices that consume energy. James requires a network and a remote or onsite monitoring computer connected to the building to determine and affect energy savings.

U.S. Patent Application No. 2012/0035776 to Zaragoza, et al. discloses an energy management system for a building which obtains energy usage data to determine a minimum feasible load which corresponds to operational conditions of the building, such as occupied or unoccupied. A threshold based on the minimum feasible load is used to monitor energy usage with the building and to identify anomalies in energy demand. The system of Zarazoga, et al. uses a pre-determined occupancy map and does not address inaccuracies in the pre-determined occupancy map.

SUMMARY OF THE INVENTION

A system and method for analyzing energy savings for a building is provided. The system implements a method includes receiving a schedule of occupied days, an occupancy behavior profile and historical energy usage data from which an hourly interval usage and a daily interval usage is determined. A set of occupancy thresholds is determined by season. Actual occupied days are determined from the occupancy thresholds and the daily interval usage. The daily interval usage is analyzed to determine occupied energy consumption in hourly intervals, occupied start and stop time savings, mechanical equipment savings and temperature setpoint savings during an occupied day. The daily interval usage is also analyzed to determine unoccupied energy consumption in the hourly intervals and refrigeration savings, mechanical equipment savings, computer and accessory equipment savings, parking lot lighting savings, hallway lighting savings and temperature setpoint savings during an unoccupied day. Energy consumption, energy savings, operational comparison and monetary savings are reported.

BRIEF DESCRIPTION OF THE DRAWINGS

FIG. 4A is an example table of historical energy usage for a building.

FIG. 4B is an example table of historical energy usage for a building.

FIG. 5 is a computer screen shot of an occupant behavior and interval analysis processing form.

FIG. 12B is a computer screen shot of a preferred embodiment of an interval data analysis report.

FIG. 13A is a computer screen shot of a preferred embodiment of an operational summary.

FIG. 13B is a computer screen shot of a preferred embodiment of an operational summary.

FIG. 14A is a computer screen shot of a preferred embodiment of a summary operational analysis rollup.

DETAILED DESCRIPTION

The system and methods described are implemented using digital computer systems. In one aspect of the present disclosure, the systems and methods are implemented on a digital computer having a processor for executing the methods embodied within a set of program instructions. The program instructions are stored in an electronic memory and in digital storage media connected to the digital computer. The digital computer has a user interface system including a display device and a keying device for interacting with a user. A digital computer can include a desktop computer, a laptop computer, a smart phone, a tablet device, a personal digital assistant, a dedicated hardware device or any other conceivable digital computer device. The digital storage media can include a compact disc, a hard drive, a flash drive or any other form of portable or non-portable persistent storage suitable for electronically storing programmed instructions.

In a preferred embodiment, the set of program instructions are implemented within a spreadsheet program on the digital computer, for example, a set of macros and Visual Basic code in a Microsoft Excel™ spreadsheet implement the methods utilizing disclosed forms and generating reports as shown in screen shots provided. However, it should be made clear that the implementation of the methods of the present disclosure is not intended to be limited to a spreadsheet implementation. For example, the methods can be implemented as an 'app' on a smart phone or a tablet device.

Embodiments of the present invention and its advantages are best understood by referring to the Figures provided.

Figure 1:
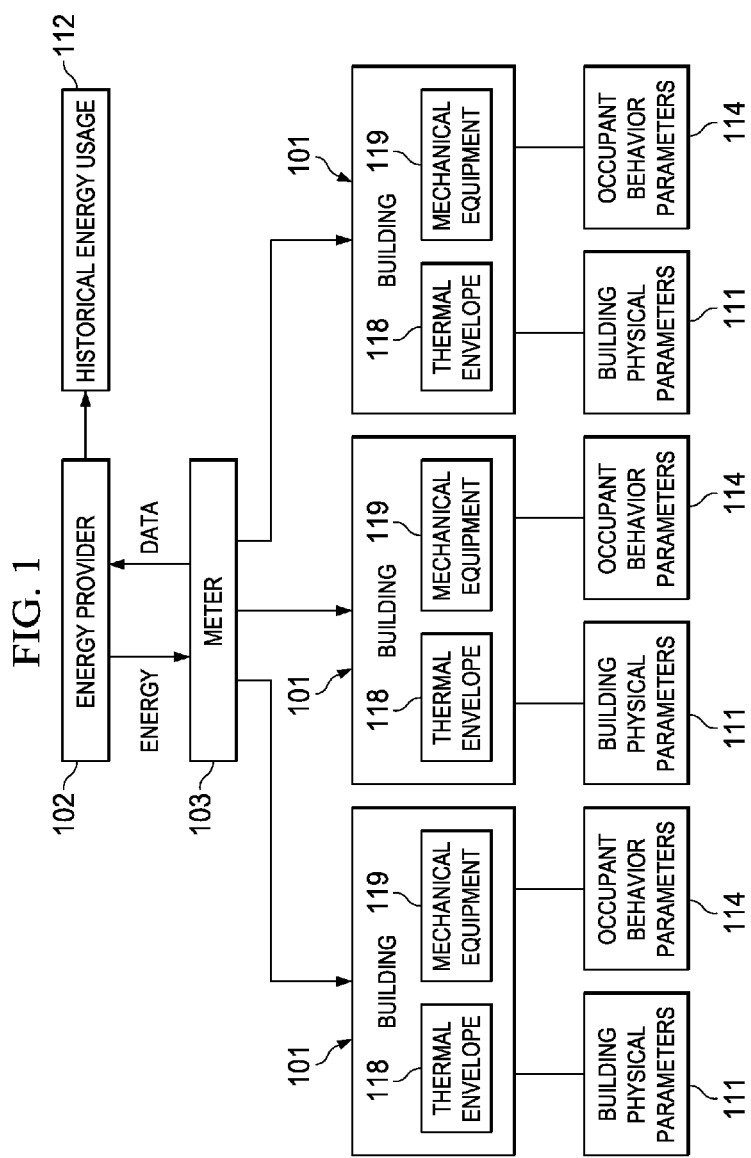
FIG. 1 is a block diagram of a typical energy distribution system of a preferred embodiment.

Referring to FIG. 1, buildings 101 are to be analyzed for energy consumption and energy savings. Buildings 101 includes thermal envelopes 118 and mechanical equipment 119. The buildings operate with building physical parameters 111 and occupant behavior parameters 114. The building physical parameters include specifications for the thermal envelope and the mechanical systems of each building. The mechanical systems include HVAC systems and thermostat settings as a function of time. The physical parameters can vary between "occupied" and "unoccupied" time periods. The occupant behavior parameters include, for example, temperature setpoints for heating and cooling seasons.

Figure 6:
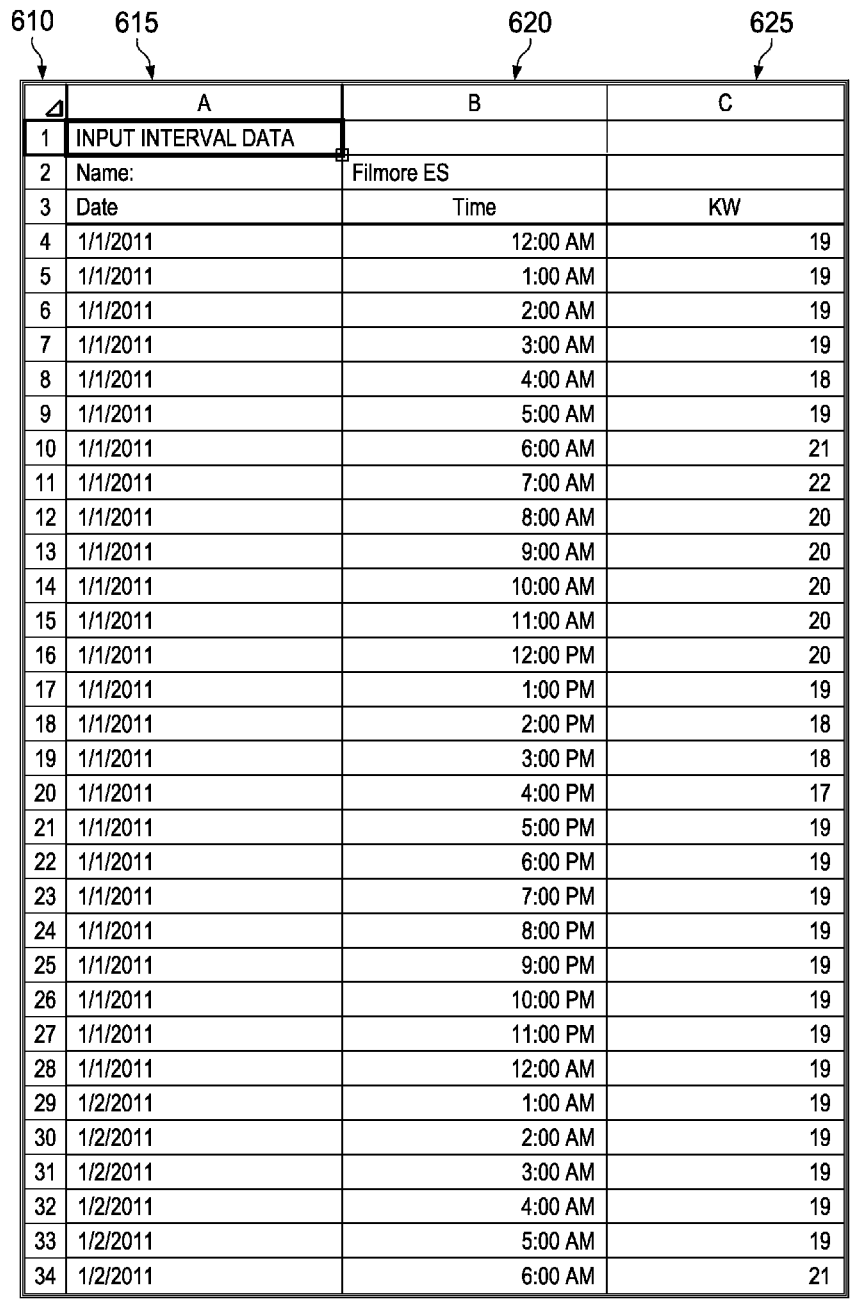
FIG. 6 is an example table of hourly interval usage for a building.

Building 101 receives energy from energy provider 102. The amount of energy provided is determined by onsite energy meter 103 in a set of time intervals. The energy usage in the set of time intervals, historical energy usage 112, is logged by energy provider 102 to facilitate billing and collection. Energy provider 102 makes historical energy usage 112 available, for example, via the internet. Onsite energy meter 103 can be manually read to provide data in historical energy usage 112. Alternatively, when the onsite energy meter is a smart digital meter, data for historical energy usage 112 can be collected electronically from the smart digital meter by building operations 110. An example of historical energy usage 112 is shown in the table of FIG. 6.

Figure 2:
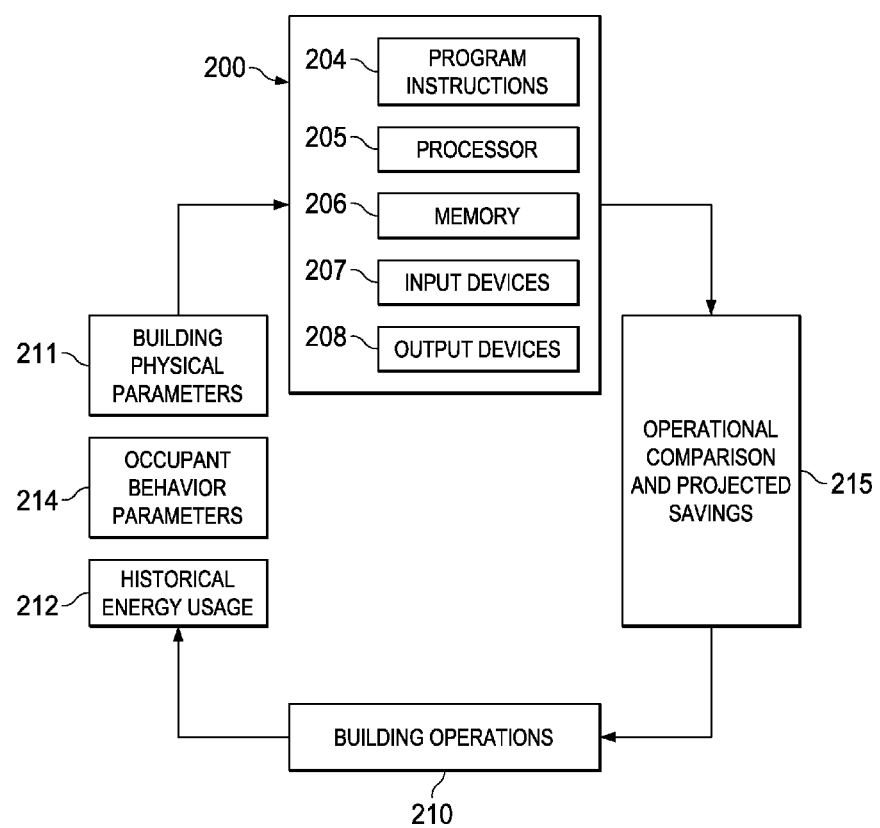
FIG. 2 is a system diagram of a preferred embodiment.

Referring to FIG. 2, an interval analysis tool 200 is provided with set of program instructions 204, processor 205, memory 206, a set of input devices 207 and a set of output devices 208. The set of input devices include, for example, a computer keyboard and a computer mouse. The set of output devices include, for example, a display and a printer.

The method, in general, executes the set of program instructions to receive building physical parameters 211, a occupant behavior parameters 214 and historical energy usage data 212. The method utilizes historical energy usage 212, set of building physical parameters 211 and set of occupant behavior parameters 214 to determine a set of operational comparisons and projected savings 215. In a preferred embodiment, set of operational control instructions based on the set of operational comparisons are implemented in building operations 210 to affect energy consumption and provide energy savings.

Figure 3:
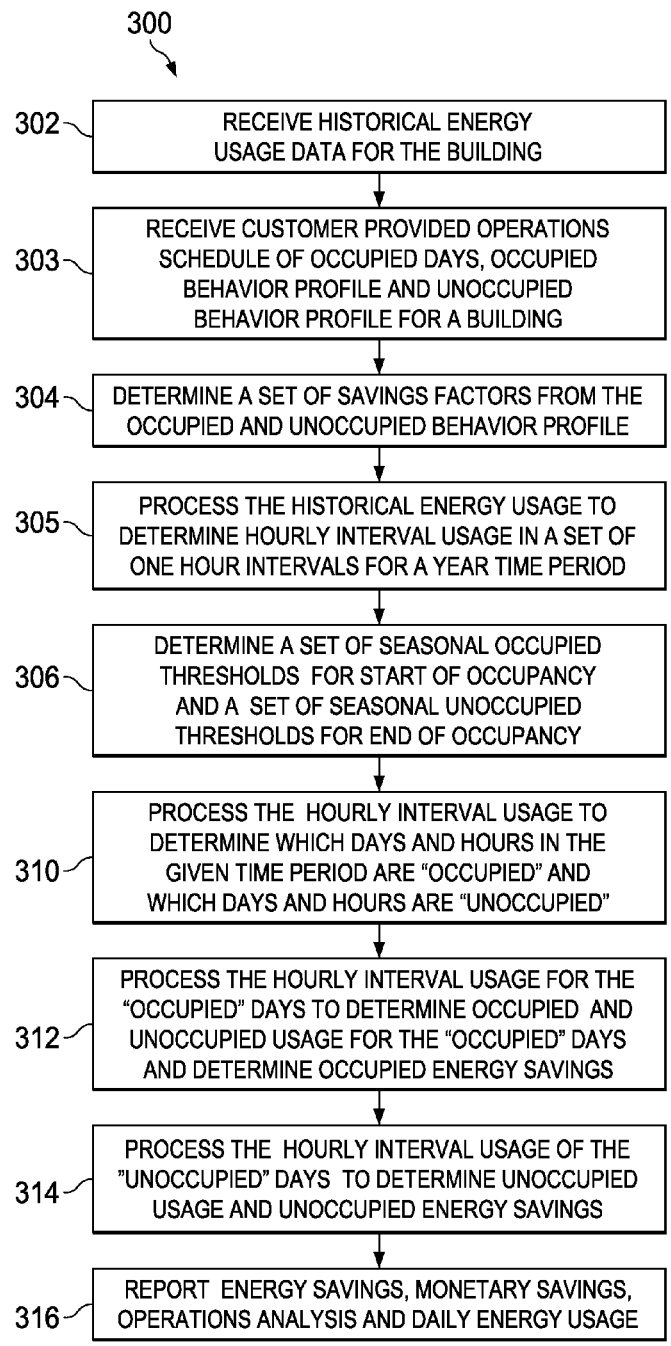
FIG. 3 is a flow chart of a preferred embodiment.

Referring to FIG. 3, a method 300 is described for assessing and implementing energy savings for a building by the interval analysis tool.

At step 302, a set of historical energy usage data for the building is received. At step 303, a set of operations parameters are received including a scheduled number of occupied days, scheduled occupancy start and stop times, and an operational rating profile including a set of temperature setpoints.

At step 304 a set of savings factors are determined from the operational rating profile and the set of temperature setpoints. An example set of savings factors and associated values are provided in Table 1.

TABLE 1

Example savings factors and values.

| Savings Factor | Value |
| --- | --- |
| Computer Factor | 0% if computer equipment and accessory equipment controlled during unoccupied times<br>C % if computer and accessory equipment are not controlled during unoccupied times |
| Hall Lighting Factor | 0% if occupancy detector for hallway lighting<br>H % if no occupancy detector for hallway |
| Parking Lot Factor | 0% if parking lot lighting controlled/off during unoccupied days;<br>P % if parking lot lighting is not controlled/on unoccupied days |
| Exhaust Fan Factor | 0% if exhaust fans turned controlled/off during unoccupied times;<br>E % if exhaust fans not controlled/on unoccupied times |
| Refrigeration Factor | 0 if refrigerators turned off during unoccupied season<br>R if refrigerators left on during unoccupied season where R is an estimated daily refrigerator energy usage in kWh for a building |
| Occupied Cooling Factor | $f(T_{ocbase} - T_{oc})$% for occupied cooling temperature setpoint $T_{oc}$ and base occupied cooling temperature setpoint $T_{ocbase}$. |
| Unoccupied Cooling Factor | $f(T_{ucbase} - T_{uc})$% for unoccupied cooling temperature setpoint $T_{uc}$ and base unoccupied cooling temperature setpoint $T_{ucbase}$. |
| Occupied Heating Factor | $g(T_{oh} - T_{ohbase})$% for occupied heating temperature setpoint $T_{oh}$ and base occupied heating temperature setpoint $T_{ohbase}$ |
| Unoccupied Heating Factor | $g(T_{uh} - T_{uhbase})$% for unoccupied heating temperature setpoint $T_{uh}$ and base unoccupied heating temperature setpoint $T_{uhbase}$ |

The values of C, H, P, E and R are determined from on-site measurements or from estimates for energy usage of computer and accessory equipment, hall lighting, parking lot lighting, exhaust fan systems and refrigeration systems, respectively. The function $f(T_1-T_2)$ is a cooling setpoint savings function for a base setpoint temperature $T_1$ and a customer provided setpoint temperature $T_2$. The function g $(T_3-T_4)$ is a heating setpoint savings function for a base setpoint temperature $T_4$ and a customer provided setpoint temperature $T_3$. In a preferred embodiment for a southern climate zone, the cooling setpoint savings function $f(T_1-T_2)$ is predefined as $T_1-T_2$ and the heating setpoint savings function $g(T_3-T_4)$ is predefined as $T_3-T_4$, using $T_1=T_{ocbase}=74°$ F. for "occupied" days and $T_1=T_{ucbase}=85°$ F. for "unoccupied" days, and using $T_4=T_{ohbase}=68°$ F. for "occupied" days and $T_4=T_{uhbase}=55°$ F. for "unoccupied" days. In alternate embodiments, other cooling setpoint savings functions $f$ and heating setpoint savings functions $g$ can be used based on empirical predictions and climate zone.

Other savings factors are conceived and can be included in an operational rating profile for other building types. For example, in a manufacturing facility, a percentage of manufacturing systems could be powered down on nights and weekends, which is characterized by a form question and an energy savings factor related to powering down behavior and a night/weekend power down factor.

At step 305, the historical energy usage is processed to determine an hourly interval usage in energy units: kW for electricity and BTU for natural gas and other heating fuels. In a preferred embodiment, the hourly interval usage comprises energy usage divided into a set of one hour intervals, 3760 one hour intervals for a one year time period divided into a set of days comprising 24 one hour intervals for each day. In alternate embodiments, the historical energy usage can be processed into an interval usage for a set of equal time intervals where an equal time interval is other than one hour in length, for example, 15 minutes, 30 minutes or 3 hours.

At step 306, the method determines a set of seasonal occupied thresholds for energy usage which define start of occupancy and a set of seasonal unoccupied thresholds for energy usage which define end of occupancy. At step 306, an average hourly usage is determined as the average of the hourly interval usage values over the complete set of one hour intervals. The set of seasonal occupied thresholds are determined by multiplying the average hourly usage by a first set of seasonal multipliers. The set of seasonal unoccupied thresholds are determined by multiplying the average hourly usage by a second set of seasonal multipliers.

In a preferred embodiment, the first and second sets of seasonal multipliers are pre-determined. Table 2 provides an example of predetermined seasonal multipliers suitable for southern climate zones of the United States.

TABLE 2

| Example Seasonal Multipliers for Southern Climate Zone | |
|---|---|
| Seasonal multiplier | Value (Southern climate zone) |
| Spring Occupied | 1.0 |
| Spring Unoccupied | 0.6 |
| Summer Occupied | 1.2 |
| Summer Unoccupied | 1.0 |
| Fall Occupied | 0.6 |
| Fall Unoccupied | 0.5 |
| Winter Occupied | 0.7 |
| Winter Unoccupied | 0.7 |

There are many alternate embodiments of step 306. In a first set of alternate embodiments the first and second sets of seasonal multipliers are empirically determined for set of different climate zones. In another alternate embodiment, a sensitivity analysis is performed to determine the first and second sets of seasonal multipliers. The sensitivity analysis is performed by repeating step 310 while adjusting the first and second sets of seasonal multipliers until a stable and repeatable number of occupied days is determined.

In another embodiment of step 306, the rate of change of energy usage between hourly intervals is determined and an occupied threshold is defined relative to a pre-defined positive rate of change of energy usage for a day and an unoccupied threshold defined relative to a pre-defined negative rate of change of energy usage in the day.

At step 310, a set of "occupied" days, a set of "unoccupied" days, a set of total energy consumptions, a set of minimum hourly energy usages, a set of maximum hourly energy usages, a set of occupancy start times and a set of occupancy stop times are determined for the year time period.

At step 310, the hourly interval usage is divided into the set of days and analyzed to determine the occupancy state of the building during a day as either an "occupied" day or an "unoccupied" day. The occupancy state is determined based on a comparison between hourly interval usages and the set of seasonal occupied thresholds. For each day in the set of days, a current season is determined for the day. A seasonal occupied threshold is selected for the day from the set of seasonal occupied thresholds based on the current season. Also, a seasonal unoccupied threshold is selected for the day from the set of seasonal unoccupied thresholds based on the current season.

If the hourly interval usage for any one hour interval in the day is greater than the seasonal occupancy threshold then the occupancy state is set to "occupied" for the day. If "occupied" then the occupancy start time is determined as the first hour of the day when the interval usage for the day exceeds the seasonal occupancy threshold. The occupancy stop time is then determined as the first hour of the day when the interval usage is less than the seasonal unoccupied threshold.

If the hourly interval usage for all hour intervals in a day are less than the seasonal occupied threshold, then occupancy state is set to "unoccupied" for the day and the occupancy start and stop times for the day are set to zero.

The set of "occupied" days include those days in the year time period with the occupancy state set to "occupied". The set of "unoccupied" days include those days in the year time period with the occupancy state set to "unoccupied".

A minimum hourly interval usage and a maximum hourly energy usage is determined for the day. A total energy consumption is determined for the day by summing all hourly interval usages for the day.

At step 312, the hourly interval usage is further analyzed to determine, for the set of "occupied" days, energy consumption during occupied hours, energy consumption during unoccupied hours, temperature setpoint savings during occupancy, occupancy start time savings and occupancy stop time savings.

At step 314, the hourly interval usage is further analyzed to determine energy consumption during "unoccupied" days, refrigeration savings during "unoccupied" days, equipment savings during "unoccupied" days and temperature setpoint savings during "unoccupied" days.

At step 316, energy consumption savings and monetary savings are reported, an operations analysis is reported including the set of operational parameters, a first daily report and a second daily report is written for each day in the year time period, a set of daily energy profile graphs are generated and a graph showing a breakdown of energy usage is generated.

FIGS. 4A and 4B show an example table 400 of historical energy usage which is a set of measured energy usage values 420 gathered in 15 minute time intervals 415 for a set of days 410 and for the electronic service identifier identification ESIID 405 associated with the building meter. The set of measured energy usage values 420 are given in kWh in the example. Example table 400 is representative of an output of step 302 and input to step 305.

Figure 5:
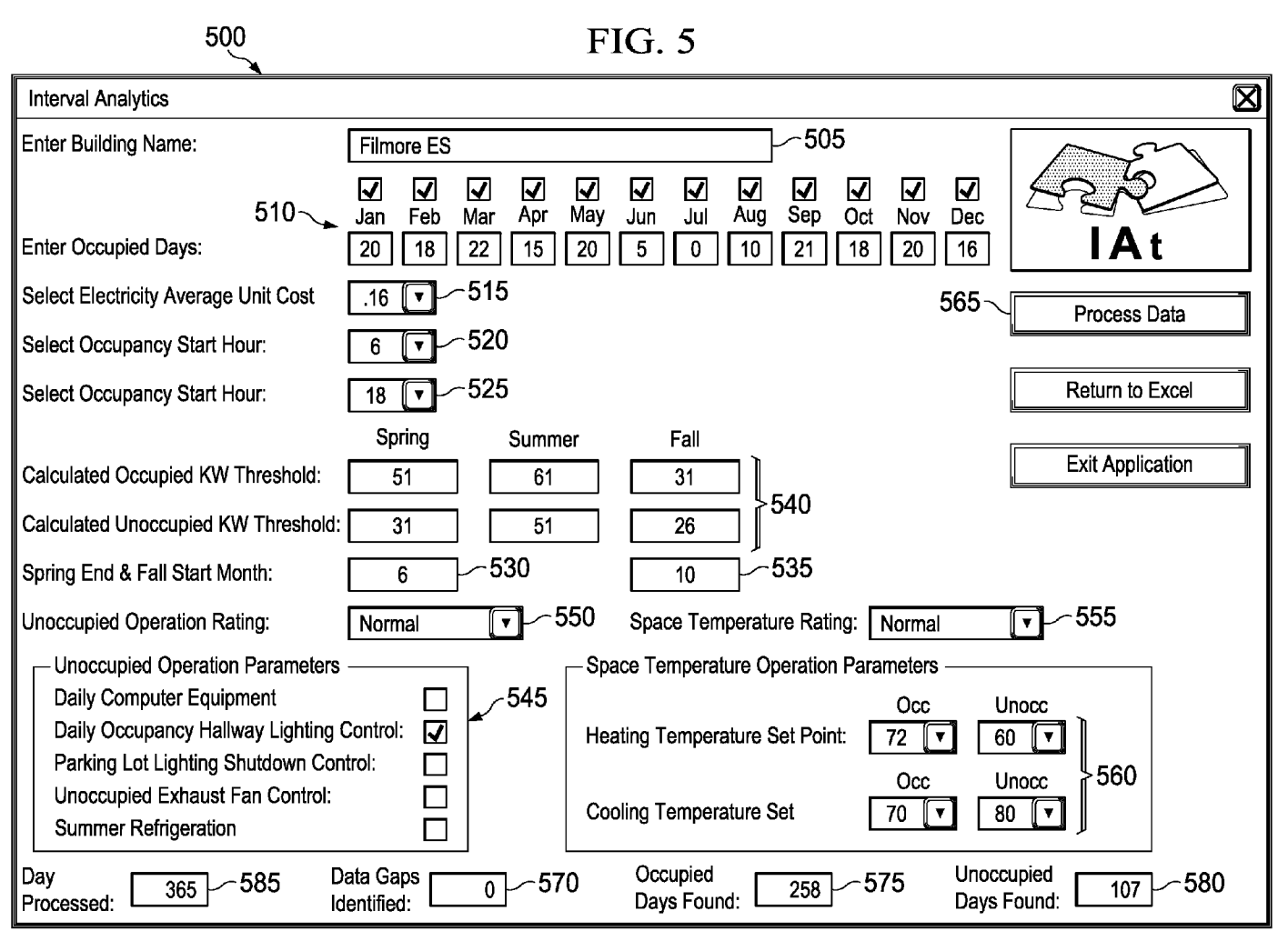

FIG. 5 shows an example of a suitable user interactive form for receiving the set of operations parameters and for generally controlling the execution of the steps of method 300. Form 500 includes process data button 565 which initiates processing of hourly interval usage data, based on the data entered into form 500. Form 500 includes a building name text box 505 for identifying the building and a set of data form controls described as follows. Form 500 includes a schedule area 510 for entering a scheduled number of occupied days in a month and for selecting the month for processing. An average unit cost for energy is entered in box 515. A scheduled occupancy start time is entered as an hour of the day in box 520. A scheduled occupancy end time is entered as an hour of the day in box 525.

Form 500 includes threshold area 540 where a set of seasonal occupied thresholds and a set of seasonal unoccupied thresholds are displayed. Seasonal start and end times are entered in box 530 (spring end month) and box 535 (fall start month). The set of seasonal occupied thresholds, the set of seasonal unoccupied thresholds and the seasonal start and end times can be adjustable or fixed. If fixed, threshold area 540 can be hidden.

Form 500 includes selector 550 and selector 555 for selecting an operational rating profile and a temperature rating profile. Form 500 displays the set of operational ratings alongside a set of checkboxes 545, based on a selected operating rating profile. The set of checkboxes 545 also allow an individual operational rating to be selected or de-selected. Form 500 displays the set of temperature setpoints, based on a selected temperature rating profile, in set of adjustable selectors 560 including an occupied heating temperature setpoint, an occupied cooling temperature setpoint, an unoccupied heating temperature setpoint and an unoccupied cooling temperature set-point. The set of adjustable selectors 560 also allow an individual temperature set-point to be entered or adjusted.

Form 500 includes status information for processing including a "days processed" box 585, a "data gaps" box 570, an "occupied days found" box 575 and an "unoccupied days found" box 580. Form 500 is programmed to update the status information after process data button 565 is selected and method 300 executes.

In a preferred embodiment, form 500 interacts with a spreadsheet. When form 500 is opened, steps 304, 305 and 306 of method 300 are automatically performed; a set of default data computed and pre-loaded from the spreadsheet into the set of data form controls for display.

FIG. 6 shows an example of hourly interval usage at table 610, which has 8760 one hour intervals in column 620 starting on the hour for set of days in column 615, extending from 12:00 am January 1 to 11:00 pm December 31 of a given year. The one hour intervals combined with the energy in kW in column 625 indicate energy consumption in energy units of kWh. Table 610 is representative of an output of step 305 and an input to steps 310, 312 and 314.

Figure 7:
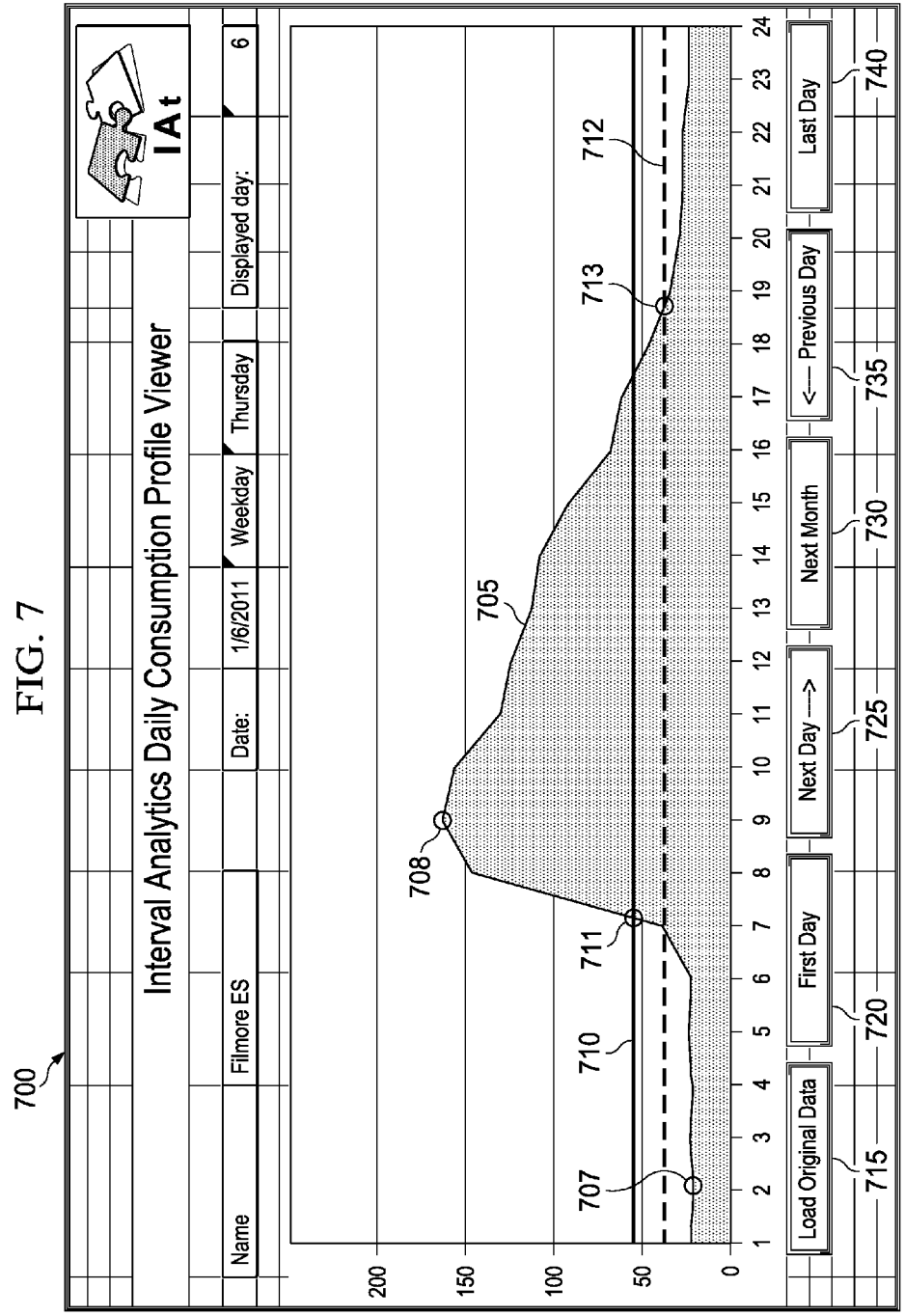
FIG. 7 is a preferred embodiment of a daily consumption profile view including a graph of historical interval usage for an occupied day.

FIG. 7 shows an example of a daily energy profile 700. Daily energy profile 700 includes a graph of hourly interval usage for a selected day in which a building is occupied. There are number of features in the daily energy profile. Daily energy profile 700 further comprises a graph of hourly interval usage 705 plotted with energy consumption in kWh as the ordinate axis and time along the abscissa. An occupied threshold 710 is shown and an unoccupied threshold 712 is shown.

In a preferred embodiment, daily energy profile 700 is provided as an interactive graphic display in which a set of control buttons facilitate selecting a day to plot the graph of historical energy usage. Control button 715 initiates step 305 wherein the historical energy usage is processed into the hourly interval usage. Control button 720 initiates a plot of the first 24 one hour intervals of hourly interval usage, representing the first day of the one year time period. Control button 725 initiates a plot of the next day of the one year time period, i.e. the next 24 one hour intervals. Control button 730 initiates an advance of the plotted day by one month. Control button 735 initiates a plot of the previous day of the one year time period, i.e. the previous 24 one hour intervals. Control button 740 initiates a plot of the last day of the one year time period.

Referring to FIG. 7, step 310 is illustrated. Graph of hourly interval usage 705 is for an "occupied" day since the hourly interval usage exceeds occupied threshold 710 from about hour 7 to about hour 17 of the "occupied" day. The occupancy start time is at point 711 near hour 7 where the hourly interval usage first exceeds occupied threshold 710. The occupancy stop time is at point 713 near hour 19 where the hourly interval usage first becomes less than unoccupied threshold 712. The minimum hourly interval usage for the "occupied" day is near hour 2 at point 707. The maximum hourly interval usage for the "occupied" day is near hour 9 at point 708. The total daily energy consumption for the "occupied" day is determined as the sum of the hourly interval usages for the "occupied" day which is approximately the area under graph of hourly interval usage 705.

Figure 8:
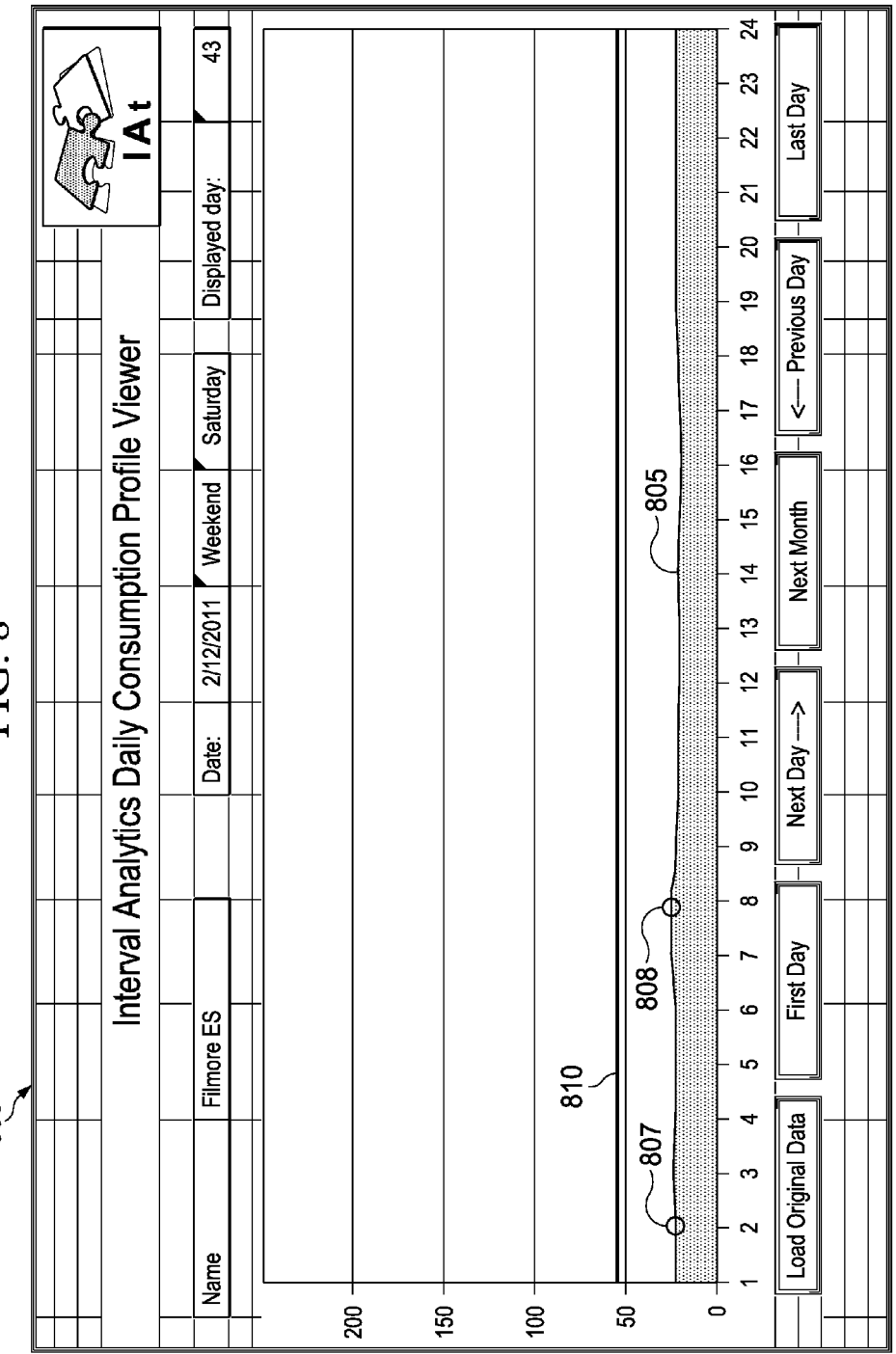
FIG. 8 is a preferred embodiment of a daily consumption profile view including a graph of historical interval usage for an unoccupied day.

Step 310 is further illustrated by the example of FIG. 8. A daily energy profile 800 is shown with a graph of hourly interval usage 805 for an "unoccupied" day since the hourly interval usage does not exceed occupied threshold 810 for any hour of the "unoccupied" day. There is no occupancy start time and no occupancy end time. The minimum hourly interval usage for the "unoccupied" day is near hour 2 at point 807. The maximum hourly interval usage for the "unoccupied" day is near hour 8 at point 808. The total daily energy consumption for the "unoccupied" day is determined as the sum of the hourly interval usages for the "unoccupied" day which is approximately the area under graph of hourly interval usage 805.

Figure 9:
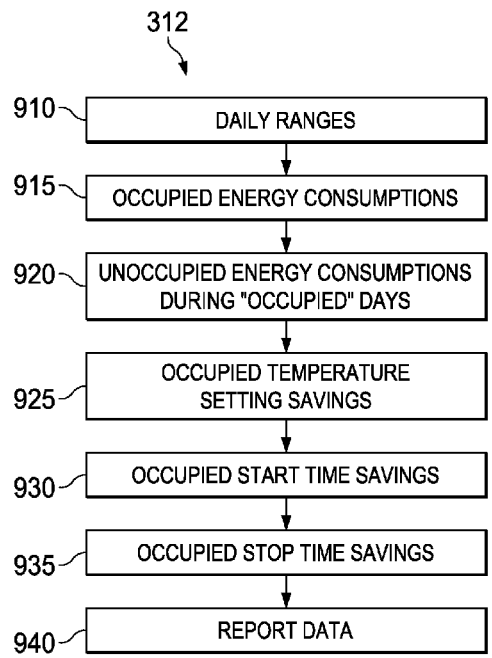
FIG. 9 is a flow chart of a preferred embodiment of a method to determine occupied energy usage and unoccupied energy usage during "occupied" days and occupied energy savings for a building.

Referring to FIG. 9, step 312 of method 300 is further described. At step 910, a set of daily ranges is determined as the time ranges between the occupancy start times and the occupancy stop times for the set of "occupied" days. At step 915, a set of occupied energy consumptions is computed as the sum of hourly interval usage between the occupied start time and the occupied stop time for each day in the set of "occupied" days.

At step 920, a first set of unoccupied energy consumptions is compiled for the set of "occupied" days. An unoccupied energy consumption in the first set of unoccupied energy consumptions is computed as the total consumption for an "occupied" day less the occupied consumption for the "occupied" day.

At step 925, a set of occupied temperature setting savings is determined for the set of "occupied" days. An occupied temperature setting savings is determined for an "occupied" day having an occupied energy consumption. If the "occupied" day is in the winter season, the occupied temperature setting savings is the occupied heating factor multiplied by the occupied energy consumption. If the "occupied" day is not in the winter season, the occupied temperature setting savings is the occupied cooling factor multiplied by the occupied energy consumption. In a preferred embodiment, the daily occupied temperature setting savings is set to zero if the day is in the winter season and the daily occupied energy consumption is less than or equal to a predetermined winter usage threshold.

At step 930, a set of occupancy start time savings is determined for the set of "occupied" days. An occupancy start time savings is determined for an "occupied" day as the occupancy start time for the "occupied day" less the scheduled occupancy start time. A total occupancy start time savings is determined by summing the set of occupancy start time savings for the set of "occupied" days.

At step 935, a set of occupancy stop time savings is determined for the set of "occupied" days. An occupancy stop time savings is determined for an "occupied" day as the occupancy stop time for the "occupied day" less the scheduled occupancy stop time. A total occupancy stop time savings is determined by summing the set of occupancy stop time savings for the set of "occupied" days.

At step 940, for each "occupied" day, a first daily report is compiled comprising the day number, the occupancy state, the occupied start time, the occupied stop time, the daily range, the occupied energy consumption, the unoccupied energy consumption, the total consumption, the occupied start time savings, the occupied stop time savings and the occupied temperature setting savings are recorded. In a preferred embodiment, step 940 writes the values of the first daily report to a set of cells in a spreadsheet which can be viewed, printed and manipulated for further energy savings analysis and reporting.

Figure 10:
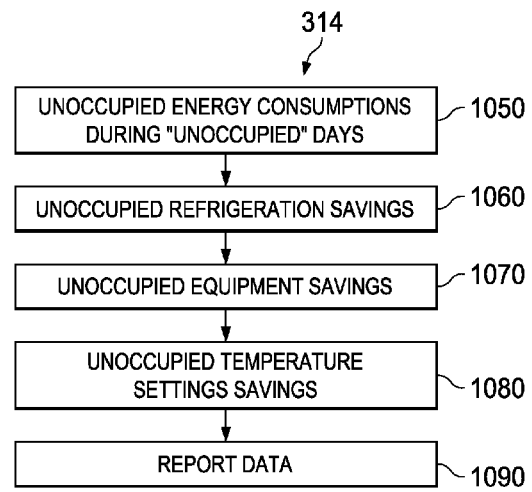
FIG. 10 is a flow chart of a preferred embodiment of a method to determine unoccupied energy usage and unoccupied energy savings during "unoccupied" days for a building.

Referring to FIG. 10, step 314 of method 300 is further described. At step 1050, a second set of unoccupied energy consumptions is determined as the set of total consumptions for the set of "unoccupied" days.

At step 1050, a set of unoccupied refrigeration savings is determined for the set of "unoccupied" days. A season is first determined for each "unoccupied" day. In a preferred embodiment, if the "unoccupied" day is in the summer season and the unoccupied energy consumption for the "unoccupied" day is greater than a predefined summer usage threshold, then the unoccupied refrigeration savings is set equal to the refrigeration factor for the "unoccupied" day.

In an alternate embodiment, a block of "unoccupied" days is determined, not necessarily occurring during the summer or in a particular season. If the "unoccupied" day is in the block of "unoccupied" days and the unoccupied energy consumption for the "unoccupied" day is greater than a predefined usage threshold, then the unoccupied refrigeration savings is set equal to the refrigeration factor for the "unoccupied" day.

At step 1060, a set of unoccupied equipment savings is determined. An unoccupied equipment savings for an "unoccupied" day is computed by multiplying the unoccupied energy consumption for the "unoccupied" day by the sum of the computer factor, the hall lighting factor, the parking lot factor and the exhaust fan factor.

At step 1070, a set of unoccupied temperature setting savings is determined for the "unoccupied day". If the "unoccupied" day is in the winter season, then an unoccupied temperature setting savings for an "unoccupied" day is determined as the unoccupied heating factor multiplied by the unoccupied energy consumption for the "unoccupied" day. If the "unoccupied" day is not in the winter season, then an unoccupied temperature setting savings for an "unoccupied" day is determined as the unoccupied cooling factor multiplied by the unoccupied energy consumption for the "unoccupied" day.

At step 1080, for each "unoccupied" day, a second daily report is compiled comprising the day number, the occupancy state, the unoccupied energy consumption, the total consumption, the unoccupied refrigeration savings, the equipment savings and the daily unoccupied temperature setting savings are recorded for the "unoccupied" day. The occupied start time, occupied stop time, the daily range, the daily occupied energy consumption, the occupied start time savings, the occupied stop time savings and the daily occupied temperature setting savings are recorded as zero for the "unoccupied" day. In a preferred embodiment, step 1090 writes the values of the second daily report to a set of cells in a spreadsheet which can be viewed, printed and manipulated for further energy savings analysis and reporting.

Figure 11A:
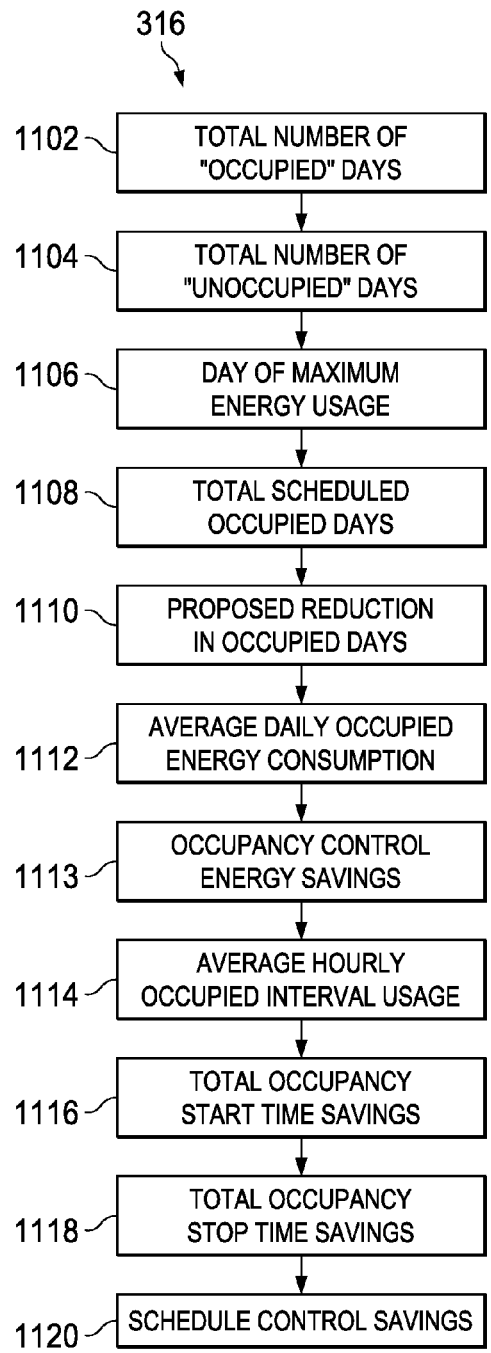
FIGS. 11A, 11B and 11C are a flow chart of a preferred embodiment of a method to report energy savings, monetary savings, operations analysis and daily energy usage.

Referring to FIG. 11A, step 316 of method 300 is further described. At step 1102, the interval analysis tool determines and records the total number of occupied days in the set of "occupied" days. At step 1104, the total number of unoccupied days is determined in the set of "unoccupied" days and recorded. At step 1106, the day of maximum occupied usage is determined from the set of maximum hourly usages and recorded. At step 1108, the total scheduled occupied days is recorded and at step 1110 a proposed reduction in occupied days is determined and recorded as the difference between the total number of occupied days and total number of scheduled occupied days.

At step 1112, an average daily occupied energy consumption is found by taking the average over the set of occupied energy consumptions. At step 1113, a total occupancy control energy savings is determined and recorded as the proposed reduction in occupied days multiplied by the average occupied day energy consumption.

At step 1114, an average hourly occupied energy consumption is determined as the average usage of the set of hourly interval usage values for the set of "occupied" days. At step 1116, an average occupancy start time savings is determined as the average of the set of occupancy start time savings and recorded in units of hours. At step 1118, an average occupancy stop time savings is determined as the average of the set of occupancy stop time savings and also recorded in units of hours. At step 1120, a total schedule control energy savings is determined and recorded as the average hourly occupied energy consumption multiplied by the sum of the average occupancy start time savings and the average occupancy stop time savings.

Figures 11B, 11C:
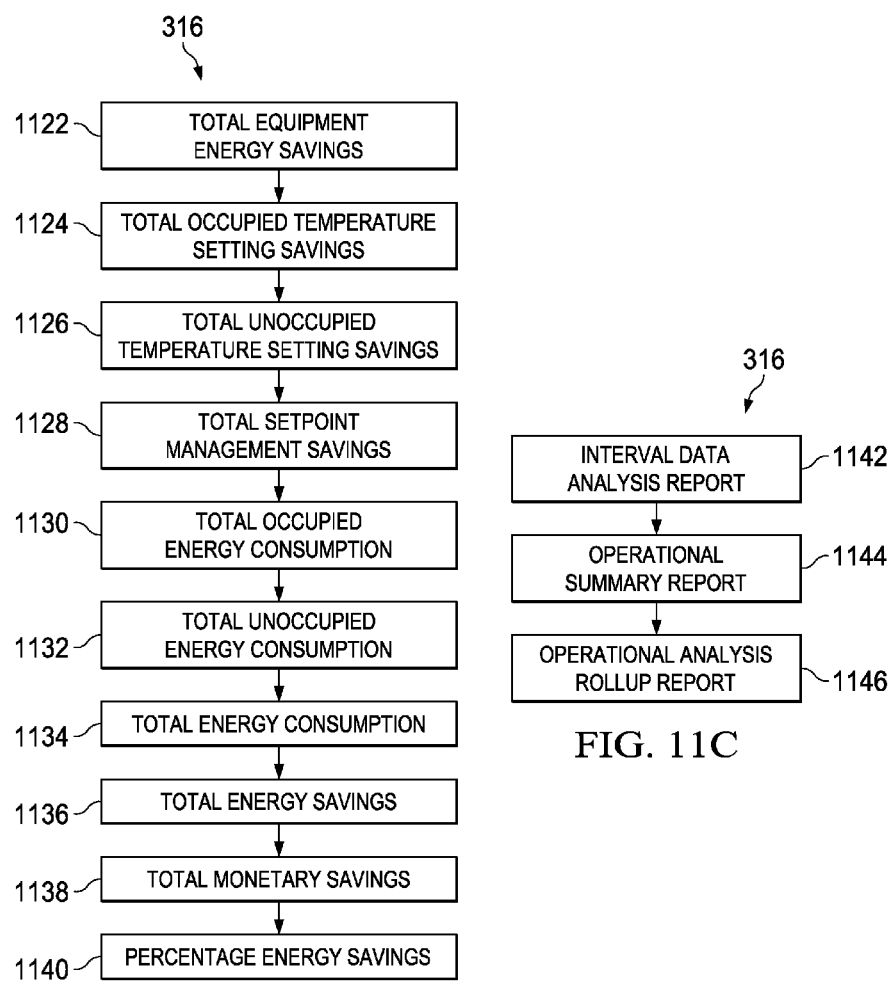

Referring to FIG. 11B, step 316 of method 300 is further described. At step 1122, a total equipment energy savings is determined and recorded as the sum over the set of unoccupied equipment savings and the sum over the set of unoccupied refrigeration savings. At step 1124, a total occupied temperature setting savings is determined and recorded as the sum over the set of occupied temperature setting savings. At step 1126, a total unoccupied temperature setting savings is determined and recorded as the sum over the set of unoccupied temperature setting savings. At step 1128, the total setpoint management energy savings is determined and recorded as the some of the total occupied temperature setting savings and the total unoccupied temperature setting savings.

At step 1130, a total occupied energy consumption is determined and recorded as the sum over the set of occupied energy consumptions. At step 1132, a total unoccupied energy consumption is determined and recorded as the sum over the set of unoccupied energy consumptions. At step 1134, a total energy consumption is determined and recorded as the sum of total occupied energy consumption and the total unoccupied energy consumption.

At step 1136, a total energy savings is determined and recorded as the sum of total occupancy control energy savings, total schedule control energy savings, total equipment energy savings and total setpoint management energy savings. At step 1138, a total monetary savings is determined and recorded as the total energy savings in a given energy unit multiplied by an average cost for the given energy unit. At step 1140, a percentage energy savings is determined and recorded as the ratio of total energy savings to total energy consumption multiplied by 100 percent.

Referring to FIG. 11C, step 316 of method 300 is further described. An interval data analysis report is generated at step 1142, an operational summary report is generated at step 1144, and an operational analysis rollup report is generated at step 1146. In alternate embodiments other reports can be generated based on operational information received and energy savings information calculated accordingly.

Figure 12A:
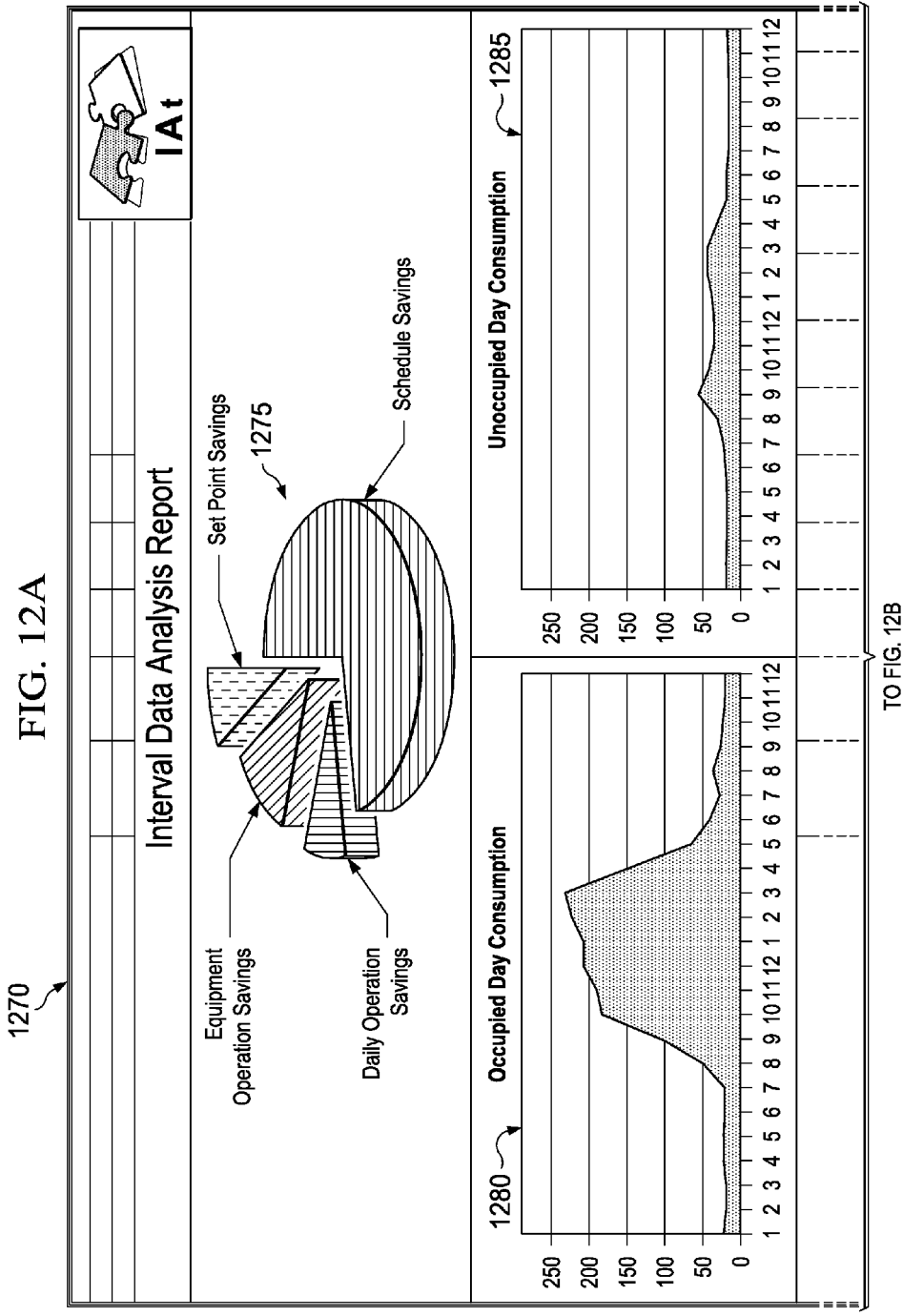
FIG. 12A is a computer screen shot of a preferred embodiment of an interval data analysis report.

Referring to FIGS. 12A and 12B, an example interval data analysis report 1270 is generated for an energy type and comprises an energy savings pie chart 1275, an occupied daily consumption profile 1280, an unoccupied daily consumption profile 1285, building consumption information 1290 and a savings summary 1295.

Savings summary 1295 includes energy savings values for the total equipment energy savings, the total setpoint management energy savings, the schedule control energy savings, the occupancy control energy savings. Energy savings pie chart 1275 plots the energy savings values by percentage of the total energy savings. Building consumption information 1290 comprises the total energy consumption, the total energy savings and a predicted energy consumption which is the total energy consumption less the total energy savings. The interval analysis tool selects an average occupied day and displays a graph of hourly interval usage data for the average occupied day in occupied daily consumption profile 1280. The interval analysis tool also selects an average unoccupied day and displays a graph of hourly interval usage data for the average unoccupied day in unoccupied daily consumption profile 1285.

Referring to FIGS. 13A and 13B, an operational summary 1300 is generated for a given energy type. The example of FIGS. 13A and 13B is shown for electrical energy; similar operational summaries are generated for natural gas and other energy types. Operational summary comprises a building name 1310 and a list of months 1315 in the given time period.

Operational summary 1300 further comprises building consumption summary 1320, occupancy reduction impact 1325, monthly occupancy analysis 1330, daily operations analysis 1335 and equipment operations analysis 1340 and a temperature control savings analysis 1345.

Building consumption summary 1320 further comprises the total energy consumption, the total unoccupied consumption, the total occupied consumption, the total energy savings and the percentage energy savings all in energy units for the given energy type.

Occupancy reduction impact 1325 further comprises the total scheduled occupied days, the total occupied days, the proposed reduction in occupied days, and the total occupancy control savings as a value and as a percentage value of total energy consumption.

Monthly occupancy analysis 1330 further comprises a tabular listing of the months included in the given time period, a scheduled monthly days of occupancy and an actual monthly days of occupancy as found by the interval analysis tool. Monthly occupancy analysis 1330 is used by the operations group to determine when the building is being occupied in an unscheduled manner and to create controls to curtail unscheduled occupancy. Daily operations analysis 1335 provides the operations group with start and stop time discrepancies, comprising the average occupied day start time savings, the average occupied day stop time savings and the total schedule control energy savings as a value in energy units and as a percentage of the total energy consumption.

Equipment operations analysis 1340 comprises a set of control items associated with a set of logical data values, the set of control items including the daily control of various equipment including computer equipment control, hallway lighting control, parking lot lighting control, unoccupied exhaust fan control and refrigeration control. If a logical data value of a control item is TRUE then the control item is being operated in an energy efficient manner. If the logical data value of a control item is FALSE, then the control item is not being operated in an energy efficient manner and operational savings has been calculated for the control item. Equipment operations analysis 1340 further includes the total equipment savings as a value in energy units and as a percentage of the total energy consumption.

Temperature control savings analysis 1345 comprises a set of temperature setpoints as provided by the operations group for occupied heating, occupied cooling, unoccupied heating and unoccupied cooling. Temperature control savings analysis 1345 further includes the total setpoint management energy savings as a value in energy units and as a percentage of total energy consumption.

Operation summary 1300 further comprises button control 1350 which is a means to create summary reports for multiple buildings. Button control 1350 includes a set of programmed instructions, when activated, causes data from the operation summary to copy for a single building and a single energy type, to an operations analysis rollup for multiple buildings.

Figure 14B:
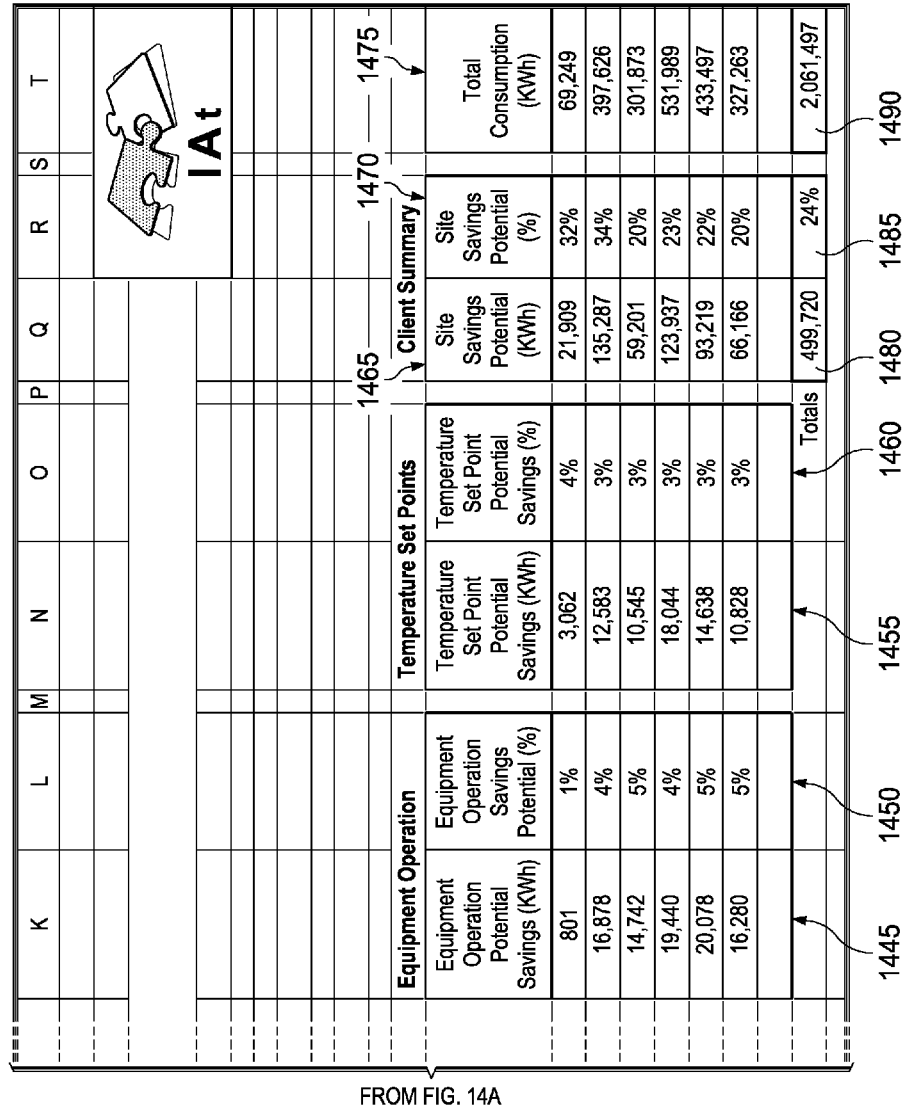
FIG. 14B is a computer screen shot of a preferred embodiment of a summary operational analysis rollup.

Referring to FIGS. 14A and 14B, an operations analysis rollup 1400 is generated from multiple instances of the operation summary for a set of buildings associated to a site. Operations analysis rollup 1400 comprises a table with a set of columns and a set of rows, where data in a row represents data generated by the interval analysis tool for a building in the set of buildings. The data is captured in the set of columns as building name 1405 and the values summarized for a building for the given time period including proposed reduction in occupied days 1410, occupancy control savings 1415, occupancy control savings percentage 1420 of the total energy consumption, average occupied day start time savings in hours 1425, average occupied day stop time savings in hours 1430, schedule control energy savings 1435, schedule control savings percentage 1440 of the total energy consumption, equipment savings 1445, equipment savings percentage 1450 of the total energy consumption, setpoint management energy savings 1455, and setpoint management savings percentage 1460 of the total energy consumption. The set of columns also include the total energy consumption 1465 which is the sum of the occupancy control savings, the schedule control savings, the equipment savings, and the setpoint management savings for each building in the set of buildings. The set of columns also include the total consumption 1475 and the percentage savings 1470 relative to total consumption 1475 for each building in the set of buildings.

Operations analysis rollup 1400 also includes an overall site energy savings 1480, overall site savings percentage 1485, and overall site energy consumption 1490. The overall site energy savings is the sum of the total energy savings for the set of buildings. The overall site energy consumption is the sum of the total energy consumptions for the set of buildings. The overall site savings percentage is the ratio of the overall site energy savings to the overall site energy consumption in percentage.

While this invention has been described in reference to a preferred embodiment along with other illustrative embodiments, this description is not intended to be construed in a limiting sense. Various modifications and combinations of the illustrative embodiments, as well as other embodiments of the invention, will be apparent to persons skilled in the art upon reference to the description. The invention is not limited to an implementation within a spreadsheet application and could be implemented, for example, as a software program suitable for any of: a web application, a stand-alone computer application, a programmable calculator application or a smart phone application. It is therefore intended that the appended claims encompass any such modifications or embodiments.

The invention claimed is:

1. A non-transitory computer readable storage device encoded with computer-executable instructions that, when executed by a processor, cause the processor perform a method of determining a total energy consumption savings and implementing operational control instructions in a building comprising:
   receiving a schedule of occupancy, a set of operational ratings and a set of temperature setpoints for the building;
   determining a set of occupied days and a set of unoccupied days in a set of days from a historical energy usage for the building;
   determining a number of occupied days and a number of unoccupied days from the historical energy usage;
   determining an occupancy start time for each day of the set of occupied days;
   determining an occupancy stop time for each day of the set of occupied days;
   determining an average daily energy usage between the occupancy start time and the occupancy stop time for the set of occupied days;
   determining an average hourly energy usage between the occupancy start time and the occupancy stop time for the set of occupied days;
   comparing the number of occupied days to the schedule of occupancy to determine a saved number of occupied days;
   multiplying the saved number of occupied days by the average daily energy usage to determine a first energy savings;
   comparing the occupancy start time and the occupancy stop time to the schedule of occupancy to determine a saved number of start hours and a saved number of stop hours for the set of occupied days;
   multiplying the saved number of start hours and the saved number of stop hours by the average hourly energy usage to determine a second energy savings;
   determining a total occupied energy consumption for the set of occupied days and a total unoccupied energy consumption for the set of unoccupied days from the historical energy usage;
   computing a third energy savings from the set of operational ratings, the total unoccupied energy consumption and the total occupied energy consumption;
   computing a fourth energy savings from the set of temperature setpoints, the total occupied energy consumption and the total unoccupied energy consumption;
   determining a total energy savings as the sum of the first energy savings, the second energy savings, the third energy savings and the fourth energy savings;
   generating and displaying a set of operational control instructions based on one or more of the first energy savings, the second energy savings, the third energy savings, the fourth energy savings, and the total energy savings; and,
   adjusting one or more of a set of control items based on the set of operational control instructions to reduce total energy consumption of the building, the set of control items comprising computer equipment control, hallway lighting control, parking lot lighting control, unoccupied exhaust fan control and refrigeration control.

2. The non-transitory computer readable storage device of claim 1 wherein the step of reporting further comprises the steps of:
   receiving a cost per unit of energy;
   multiplying the cost per unit of energy by the total energy savings to determine a total monetary savings; and,
   reporting the total monetary savings.

3. The non-transitory computer readable storage device of claim 2 wherein the step of reporting further comprises the steps of:
   determining a total energy consumption as the sum of the total occupied energy consumption and the total unoccupied energy consumption; and,
   displaying the total energy consumption, the total occupied energy consumption, the total unoccupied energy consumption and the total energy savings in a report.

4. The non-transitory computer readable storage device of claim 3 wherein the step of reporting further comprises the steps of displaying a scheduled occupancy analysis, a daily operations analysis, an equipment operations analysis and a temperature control savings analysis in the report.

5. The non-transitory computer readable storage device of claim 3 wherein the step of displaying a scheduled occupancy analysis further comprises the steps of:
   comparatively displaying the schedule of occupancy and the set of occupied days; and,
   displaying the first energy savings.

6. The non-transitory computer readable storage device of claim 3 wherein the step of displaying a daily operations analysis further comprises the steps of:
   displaying the saved number of start hours, the saved number of stop hours and the second energy savings.

7. The non-transitory computer readable storage device of claim 3 wherein the step of displaying an equipment operations analysis further comprises displaying the set of operational ratings and the third energy savings.

8. The non-transitory computer readable storage device of claim 3 wherein the step of displaying a temperature control savings analysis further comprises displaying the set of temperature setpoints and the fourth energy savings.

9. The non-transitory computer readable storage device of claim 1 wherein the step of determining a set of occupied days and a set of unoccupied days further comprises:
   determining a set of interval usages from a set of historical energy usage data;
   determining an occupied usage threshold for a season;

determining an unoccupied usage threshold for the season;

determining an occupancy state for a day wherein the occupancy state is "occupied" if any interval usage in the set of interval usages exceeds the occupied usage threshold and wherein the occupancy state is "unoccupied" if no interval usage in the set of interval usages exceeds the occupied usage threshold;

including the day in the set of occupied days if the occupancy state is "occupied;" and, including the day in the set of unoccupied days if the occupancy state is "unoccupied".

10. The non-transitory computer readable storage device of claim 9 wherein the step of determining the occupancy start time further comprises:

ordering the set of interval usages by time of day;

determining the occupancy start time as the time of the first interval usage in the set of interval usages that exceeds the occupied usage threshold.

11. The non-transitory computer readable storage device of claim 10 wherein the step of determining a total occupied energy consumption further comprises:

summing into the total occupied energy consumption, all interval usages in the set of interval usages between the occupancy start time and the occupancy stop time for all days in the set of occupied days.

12. The non-transitory computer readable storage device of claim 10 wherein the step of determining a total unoccupied energy consumption further comprises:

summing into the total unoccupied energy consumption, all interval usages in the set of interval usages outside of the time interval between the occupancy start time and the occupancy stop time for all days in the set of occupied days; and, summing into the total unoccupied energy consumption, all interval usages in the set of interval usages for all days in the set of unoccupied days.

13. The non-transitory computer readable storage device of claim 9 wherein the step of determining the occupancy stop time further comprises:

determining the occupancy stop time as the first time after the occupancy start time, when an interval usage in the set of interval usages becomes less than the unoccupied usage threshold.

14. The non-transitory computer readable storage device of claim 1 wherein the step of reporting further comprises the steps of:

displaying the first energy savings, the second energy savings, the third energy savings and the fourth energy savings in the electronic report as a graphical object.

15. The non-transitory computer readable storage device of claim 14 wherein the step of reporting further comprises the steps of:

generating a first energy profile for an occupied day;

generating a second energy profile for an unoccupied day; and, displaying the first energy profile and the second energy profile.

16. The non-transitory computer readable storage device of claim 14 wherein the step of reporting further comprises the steps of:

determining a total energy consumption as the sum of the total occupied energy consumption and the total unoccupied energy consumption;

displaying the total energy consumption and the total energy savings.

17. The non-transitory computer readable storage device of claim 1 wherein the step of computing a third energy savings further comprises:

receiving an operational rating in the set of operational ratings that is for computer equipment operation;

determining a savings factor if the operational rating indicates that the computer equipment operation is not controlled during unoccupied times; and, computing a portion of the third energy savings by multiplying the savings factor by the total unoccupied energy consumption.

18. The non-transitory computer readable storage device of claim 1 wherein the step of computing a third energy savings includes:

receiving an operational rating in the set of operational ratings that is for lighting;

determining a savings factor related to the operational ratings; and, computing a portion of the third energy savings by multiplying the savings factor by the total unoccupied energy consumption.

19. The non-transitory computer readable storage device of claim 1 wherein the step of computing a third energy savings further comprises:

receiving an operational rating in the set of operational ratings that is for exhaust fan operation;

determining a savings factor related to the operational rating; and, computing a portion of the third energy savings by multiplying the savings factor by the total unoccupied energy consumption.

20. The non-transitory computer readable storage device of claim 1 wherein the step of computing a third energy savings further comprises:

receiving an operational rating in the set of operational ratings that is for refrigeration equipment a block of unoccupied days;

determining a savings factor related to the operational rating; and, computing a portion of the third energy savings by multiplying the savings factor by the number of unoccupied days within the block of unoccupied days.

21. The non-transitory computer readable storage device of claim 1 wherein the step of computing a fourth energy savings further comprises:

providing a first base temperature setpoint for a set of mechanical equipment during occupied times;

providing a second base temperature setpoint for the set of mechanical equipment during unoccupied times;

receiving a first temperature setpoint for the set of mechanical equipment during occupied times;

receiving a second temperature setpoint for the set of mechanical equipment during unoccupied times;

determining a first savings factor for the set of mechanical equipment as a function of the temperature difference between the first base temperature setpoint and the first temperature setpoint;

determining a second savings factor for the set of mechanical equipment as a function of the temperature difference between the second base temperature setpoint and the second temperature setpoint; and, computing a first portion of the fourth energy savings by multiplying the first savings factor by the total occupied energy consumption; and, computing a second portion of the fourth energy savings by multiplying the second savings factor by the total unoccupied energy consumption.

22. The non-transitory computer readable storage device of claim 1 wherein the step of receiving a schedule of occupancy, a set of operational ratings and a set of temperature setpoints for the building further comprises:
  processing an entry of a scheduled number of occupied days in a month for at least twelve months;
  processing an entry of a scheduled occupancy start time and the entry of a scheduled occupancy stop time;
  processing a selection of the set of operational ratings and the entry of the set of temperature setpoints;
  processing a selection of an operational rating condition and a temperature rating condition;
  selecting the set of operational ratings based on selecting an operational rating condition; and,
  populating the set of temperature setpoints based on selecting a temperature rating condition.

23. The non-transitory computer readable storage device of claim 1 further comprising:
  selecting a day; and,
  displaying an energy profile for the day wherein the energy profile includes a graph of the historical energy usage for the day and an occupancy threshold for the day.

24. The method of claim 1 further comprising:
  reporting the saved number of occupied days, the saved number of start hours and the saved number of stop hours, the first energy savings, the second energy savings, the third energy savings, the fourth energy savings and the total energy savings.

25. The non-transitory computer readable storage device of claim 1 further comprising the steps of:
  determining a set of total energy consumption savings for a set of buildings;
  displaying for each building in the set of buildings, the saved number of occupied days, the saved number of start hours, the saved number of stop hours, the first energy savings, the second energy savings, the third energy savings, the fourth energy savings and the total energy savings and the total energy consumption wherein the total energy consumption is the sum of the total occupied energy consumption and the total unoccupied energy consumption for the set of days;
  summing a first grand total of the total energy consumption for the set of buildings;
  summing a second grand total of the total energy savings for the set of buildings; and,
  displaying the first grand total and the second grand total.

26. A system for assessing an operational energy savings and implementing operational control instructions for a building comprising:
  a processor with memory and a set of program instructions in memory, wherein the set of program instructions, when executed by the processor, carries out the steps of:
    determining a set of occupied days and a set of unoccupied days in a set of days from a historical energy usage for the building;
    determining a number of occupied days and a number of unoccupied days in the set of days from the historical energy usage for the building;
    determining an occupancy start time for each day of the set of occupied days;
    determining an occupancy stop time for each day of the set of occupied days;
    determining an average daily energy usage between the occupancy start time and the occupancy stop time for the set of occupied days;
    determining an average hourly energy usage between the occupancy start time and the occupancy stop time for the set of occupied days;
    comparing the number of occupied days to a schedule of occupancy to determine a saved number of occupied days;
    multiplying the saved number of occupied days by the average daily energy usage to determine a first energy savings;
    comparing the occupancy start time and the occupancy stop time to the schedule of occupancy to determine a saved number of start hours and a saved number of stop hours for the set of occupied days;
    multiplying the saved number of start hours and the saved number of stop hours by the average hourly energy usage to determine a second energy savings;
    determining a total occupied energy consumption for the set of occupied days and a total unoccupied energy consumption for the set of unoccupied days from the historical energy usage;
    computing a third energy savings from a set of operational ratings, the total unoccupied energy consumption and the total occupied energy consumption;
    computing a fourth energy savings from a set of temperature setpoints, the total occupied energy consumption and the total unoccupied energy consumption; and,
    determining a total energy savings as the sum of the first energy savings, the second energy savings, the third energy savings and the fourth energy savings;
    generating and displaying a set of operational control instructions based on one or more of the first energy savings, the second energy savings, the third energy savings, the fourth energy savings, and the total energy savings; and,
    adjusting one or more of a set of control items based on the set of operational control instructions to reduce total energy consumption of the building, the set of control items comprising computer equipment control, hallway lighting control, parking lot lighting control, unoccupied exhaust fan control and refrigeration control.

27. The system of claim 26 wherein the set of program instructions, when executed by the processor carry out the further steps of:
  processing the entry of a scheduled number of occupied days in a month for at least twelve months;
  processing the entry of a scheduled occupancy start time and the entry of a scheduled occupancy stop time;
  processing the selection of the set of operational ratings and the entry of the set of temperature setpoints;
  processing the selection of an operational rating condition and a temperature rating condition;
  selecting the set of operational ratings based on selecting an operational rating condition; and,
  populating the set of temperature setpoints based on selecting a temperature rating condition.

28. The system of claim 26 further comprising a spreadsheet program for implementing the set of program instructions.

29. The system of claim 26 further comprising:
  a display;
  wherein the set of program instructions, when executed by the processor carry out the further step of:
    selecting a day; and,
    displaying the historical energy usage for the day and an occupancy threshold for the day on the display.

30. The system of claim 26 further comprising an electronic display of a graphical object comprising the first energy savings, the second energy savings, the third energy savings and the fourth energy savings.

31. The system of claim 26 wherein the set of program instructions when executed by the processor carry out the further steps of:
- displaying the saved number of occupied days, the saved number of start hours, the saved number of stop hours, the first energy savings, the second energy savings, the third energy savings, the fourth energy savings and the total energy savings and the total energy consumption wherein the total energy consumption is the sum of the total occupied energy consumption and the total unoccupied energy consumption for the set of days;
- summing a first grand total of the total energy consumption; and,
- summing a second grand total of the total energy savings.

* * * * *